United States Patent
Nomura

[19]

[11] Patent Number: 6,128,347
[45] Date of Patent: Oct. 3, 2000

[54] SIGNAL TRANSMISSION CIRCUIT WITH PROTECTION LINE DRIVEN WITH SIGNAL HAVING SAME PHASE AS TRANSMISSION SIGNAL

[75] Inventor: Masahiro Nomura, Tokyo, Japan

[73] Assignee: NEC Corporation, Tokyo, Japan

[21] Appl. No.: 08/925,536

[22] Filed: Sep. 8, 1997

[30] Foreign Application Priority Data

Sep. 10, 1996 [JP] Japan .................................. 8-239308

[51] Int. Cl.[7] ...................................................... H04B 3/00
[52] U.S. Cl. ........................................... 375/257; 375/296
[58] Field of Search ..................................... 375/254, 257, 375/296, 346; 333/244; 257/307, 659, 665; 327/514, 551, 565

[56] References Cited

U.S. PATENT DOCUMENTS 5,043,792  8/1991  Adachi ...................................... 257/773
5,150,189  9/1992  Shirai et al. ............................. 327/514

FOREIGN PATENT DOCUMENTS 3-224261  10/1991  Japan .
4-20019   1/1992   Japan .
5-151776  6/1993   Japan .

*Primary Examiner*—Stephen Chin
*Assistant Examiner*—Chieh M. Fan

[57] ABSTRACT

In a signal transmission circuit, a logic circuit performs a logical calculation to at least an inputted signal to output a transmission signal. A signal line driver circuit is connected to an end of a signal line, and drives the signal line in accordance with the transmission signal. The other end of the signal line is connected to a receiver. A protection line is provided in parallel to the signal line. A protection line driver circuit is connected to an end of the protection line, and drives the protection line in accordance with a protection signal having a same phase as the transmission signal.

21 Claims, 16 Drawing Sheets

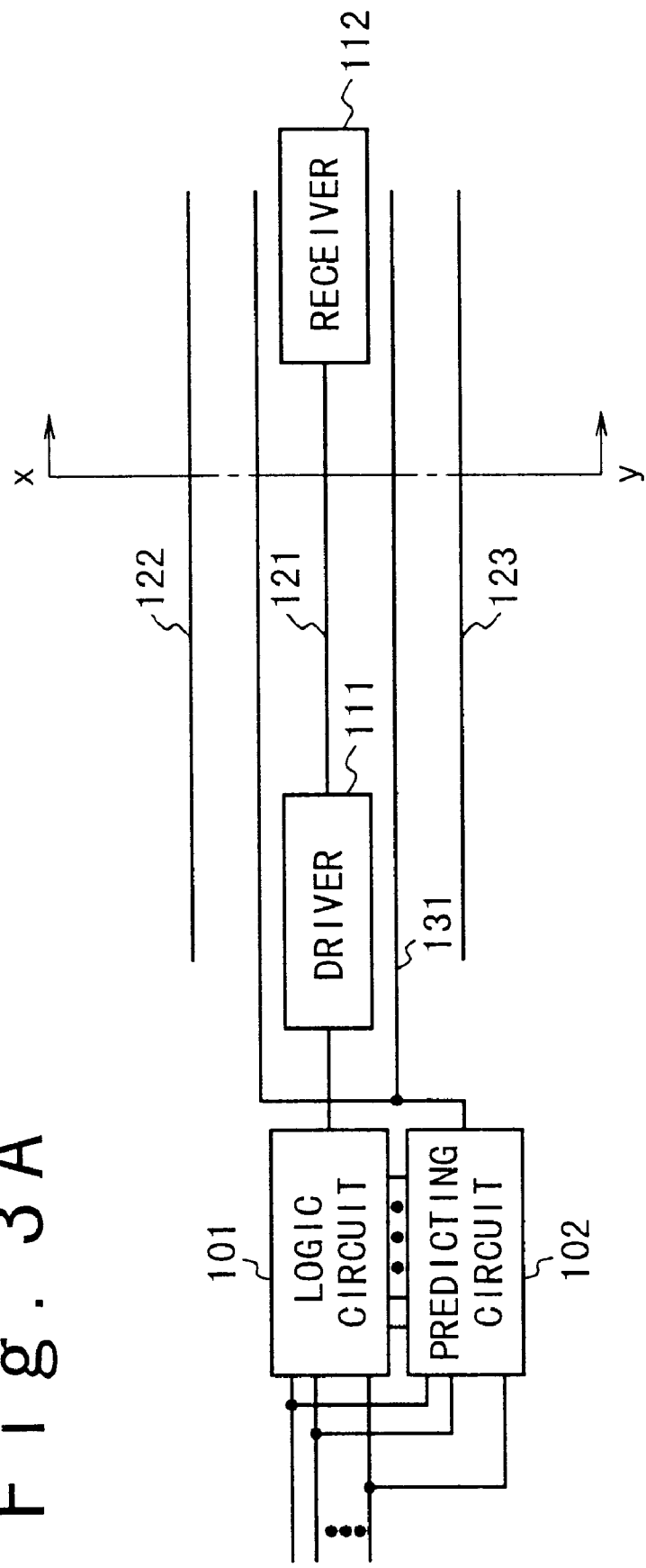
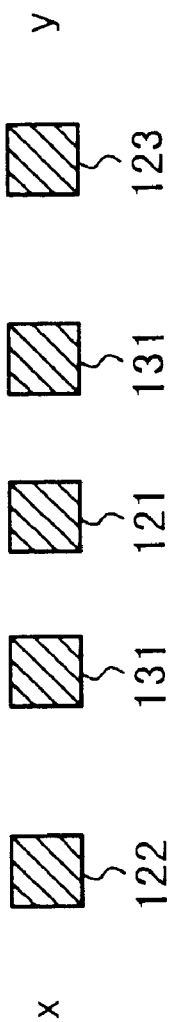
Fig. 3A
Fig. 3B

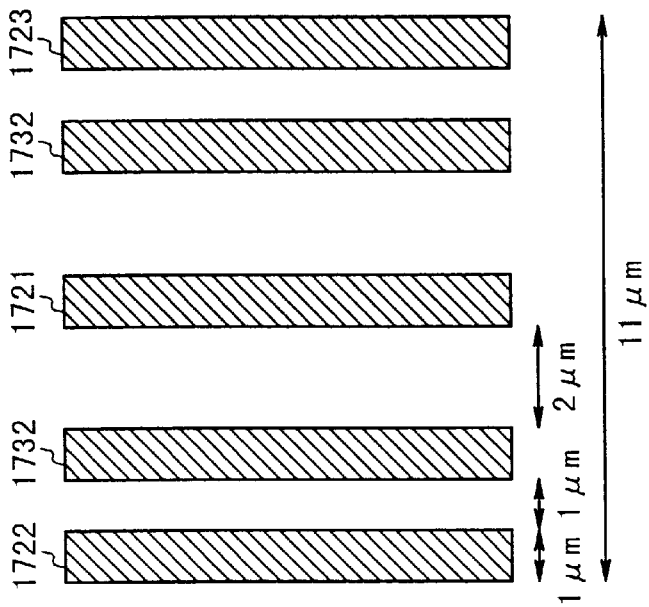
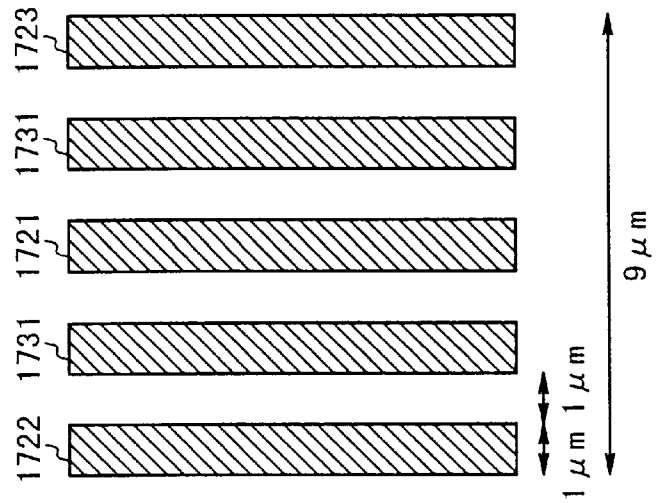
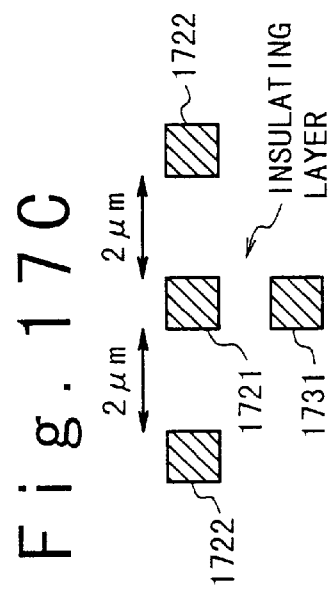

SIGNAL TRANSMISSION CIRCUIT WITH PROTECTION LINE DRIVEN WITH SIGNAL HAVING SAME PHASE AS TRANSMISSION SIGNAL

BACKGROUND OF THE INVENTION

1. Field of the Invention

The present invention relates to a signal transmission circuit in which a data signal line is driven based on a logic data and a transmitted data signal is received. More particularly, the present invention relates to a signal transmission circuit in which cross talk noise from a signal line other than this data signal line is reduced and further increase of transmission speed of the data signal can be accomplished.

2. Description of the Related Art

In a conventional semiconductor integrated circuit, capacitive coupling between adjacent signal lines to each other becomes strong with high density integration and formation of a fine wiring pattern. For this reason, cross talk noise due to the capacitive coupling has been a big problem in the operation of the semiconductor integrated circuit.

FIG. 1 is a circuit diagram illustrating the structure of a first conventional example of a general signal transmission circuit. In the first conventional example of the signal transmission circuit, a data signal line 1321 is driven by the drive inverter 1311 based on the data signal generated by a logic circuit 1301. The data signal is received by a receiver inverter 1312. Two data signal lines 1322 and 1323 are provided to be adjacent to the data signal line 1321. Therefore, the data signal line 1321 has a total parasitic capacitance composed of capacitances 1343 and 1344 between the data signal line 1321 and the two data signal lines 1322 and 1323, the gate capacitance 1341 of the receiver inverter 1312 and a capacitance 1342 between the data signal line 1321 and a ground line.

When the signal levels on two data signal lines 1322 and 1323 change, the data signal line 1321 undergoes the influence of cross talk noise in correspondence to a ratio of the parasitic capacitances 1343 and 1344 to the total parasitic capacitance. In other words, when the signal levels on the two data signal line 1322 and 1323 change, a signal level on the data signal line 1321 changes with the change of the signal levels on the signal lines 1322 and 1323, even if the signal line 1321 is driven to a predetermined level.

If the current drive ability of the drive inverter 1311 to the data signal line 1321 is not so sufficient that the level change of the signal level on the data signal line 1321 exceeds the logic threshold value of the receiver inverter 1312, the influence spreads to logic circuits subsequent to the receiver inverter 1312. As a result, a reception system (not shown) operates erroneously.

Also, the signals on the two data signal line 1322 and 1323 change into the direction opposite to that of the change of the signal on the data signal line 1321. In this case, the changes of the signals on the data signal lines 1322 and 1323 influence to the signal on the data signal line 1321 to delay the signal transmission on the data signal line 1321. Therefore, any measures are required to reduce the influence of the cross talk noise as described above.

FIG. 2 is a circuit diagram illustrating the structure of a second conventional example of the signal transmission circuit in which a measure adopting shield lines is taken. In the second conventional example of the signal transmission circuit, two shield lines 1431 and 1432 which are connected to the ground line are provided between each of the two data signal lines 1422 and 1423 and the data signal line 1421. As a result, the capacitive coupling between the data signal line 1421 and each of the two data signal lines 1422 and 1423 is blocked off.

As such a conventional example, a data bus structure of the semiconductor memory device which is disclosed in Japanese Laid Open Patent Disclosure (JP-A-Heisei 5-151776) is known. In this data bus structure, the shield lines are provided on both sides of complementary data bus lines in parallel. The shield lines are connected to a power supply line or a ground line of a differential data amplifier which is connected to the data bus lines. Accordingly, even if cross talk noise is generated on the data bus lines via the shield lines because of the signal level change on another data signal line around the shield line, the differential data amplifier does not operate erroneously. This is because the cross talk noise acts as in-phase noise on the complementary data bus lines.

Besides, as such a conventional example, the semiconductor integrated circuit device which is disclosed in Japanese Laid Open Patent Disclosure (JP-A-Heisei 3-224261) is known. In the semiconductor integrated circuit device, for the purpose that noise endurance can be increased without decreasing the size precision of the data signal line, one or more lines are provided on one or both sides of a plurality of signal lines for transmitting in-phase signals, in parallel. The one or more lines are set in a floating state.

However, when these conventional examples of the signal transmission circuit are applied to a semiconductor integrated circuit to eliminate the influence of cross talk noise while maintaining the speeding-up of transmission speed and the integration of the semiconductor integrated circuit, there are the following problems.

That is, there is the possibility that the erroneous operation of the circuit and the delay of signal transmission can be avoided in a specific noise mode which depends on the pattern of the cross talk noise in any conventional examples. However, as the first problem, because the capacitance between the signal line and the shield line finally increases a signal line load, the delay of the average signal transmission increases from the viewpoint of the total operation speed.

As the second problem, in order to suppress increase of the signal line load based on of the capacitance between the shield line and the signal line, it is necessary to provide a space between the signal line and the shield line in either of conventional examples. Therefore, an extra substrate area is required for the shield lines, resulting in increase of the area overhead of the shield lines.

SUMMARY OF THE INVENTION

The present invention is accomplished in the viewpoint of the above-mentioned problems. An object of the present invention is to provide a signal transmission circuit and a signal transmission method, in which cross talk noise can be reduced while preventing the delay of signal transmission, in a semiconductor integrated circuit.

Another object of the present invention is to provide a signal transmission circuit and a signal transmission method, in which cross talk noise can be reduced while reducing an area overhead of a wiring area in a semiconductor integrated circuit.

In order to achieve an aspect of the present invention, a signal transmission circuit includes a logic circuit for performing a logical calculation to at least an inputted signal to output a transmission signal, a signal line, a signal line driver circuit connected to an end of the signal line, for driving the signal line in accordance with the transmission signal, the other end of the signal line being connected to an receiver, a protection line provided in parallel to the signal line, and a protection line driver circuit connected to an end of the protection line, for driving the protection line in accordance with a protection signal having a same phase as the transmission signal.

The protection line has a length equal to at least a part of the signal line and has the other end opened, and is provided on or under the signal line via an insulating layer. When another signal line is provided in parallel to the signal line, the protection line is provided between the signal line and the other signal line. Also, when the signal transmission circuit is formed in a semiconductor circuit, a distance between the signal line and the protection line and a distance between the protection line and the other signal line are equal to a least pattern size.

The signal transmission circuit may further includes a protection signal generating circuit for predicting the transmission signal and for generating the protection signal based on the predicting result.

The protection signal is identical to the transmission signal. In this case, the protection line driver circuit drives the protection line in accordance with the protection signal such that a signal on the protection line has an amplitude larger than that of a signal on the signal line. The logic circuit inputs the at least one signal in synchronous with a clock signal to output the transmission signal, and the protection line driver circuit drives the protection line in accordance with the protection signal in synchronous with the clock signal. Further, the protection line driver circuit drives the protection line in accordance with the protection signal such that a signal on the protection line has an amplitude larger than that of a signal on the signal line.

The logic circuit inputs the at least one signal in synchronous with a clock signal to output the transmission signal. In this case, the protection line driver circuit drives the protection line in accordance with the protection signal which is obtained from a logical calculation of the clock signal and a delayed signal of the clock signal. The delay time of the clock signal is substantially a same as a time for the logical calculation in the logic circuit.

In addition, the logic circuit inputs the at least one signal in synchronous with a clock signal and outputs an intermediate stage signal in addition to the transmission signal. In this case, the protection line driver circuit drives the protection line in accordance with the protection signal which is obtained from a logical calculation of the clock signal, a delayed signal of the clock signal and the intermediate stage signal, a delay time of the clock signal being substantially a same as a time for the logical calculation in the logic circuit. Also, the signal line driver circuit drives the signal line in accordance with the transmission signal in synchronous with the clock signal.

In order to achieve another aspect of the present invention, a signal transmission circuit includes a logic circuit for performing a logical calculation to at least one inputted signal to output a transmission signal, a register for supplying the at least one signal to the logic circuit in synchronous with a clock signal, a signal line, a signal line driver circuit connected to an end of the signal line, for driving the signal line in accordance with the transmission signal, the other end of the signal line being connected to an receiver, a protection line provided between the signal line and another signal line in parallel to the signal line, and a protection line driver circuit connected to an end of the protection line, for driving the protection line in synchronous with the clock signal such that a signal on the protection line rises at substantially the same timing as a signal on the signal line, the other end of the protection line being opened.

In order to achieve still another aspect of the present invention, a method of transmitting a data signal in a transmission circuit, includes the steps of:

providing a protection line between a signal line and another signal line in parallel to the signal line, an end of the protection line on a receiver side being opened;

driving the signal line in accordance with a data signal; and driving the protection line in synchronous with the data signal.

BRIEF DESCRIPTION OF THE DRAWINGS

FIG. 3A is a circuit diagram illustrating the principle of the present invention and FIG. 3B is a schematic cross sectional view along the X-Y line in FIG. 3A;

FIGS. 17A and 17B are diagrams illustrating wiring areas in the present invention and in the conventional examples, and FIG. 17C is a cross sectional view of lines.

DESCRIPTION OF THE PREFERRED EMBODIMENTS

Figure 1:
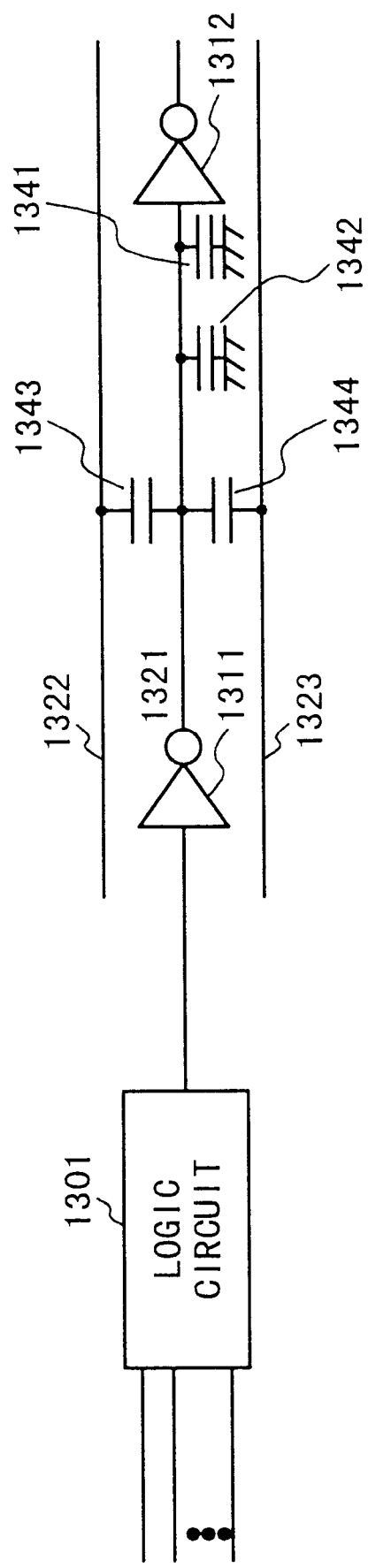
FIG. 1 is a circuit diagram illustrating the structure of the first conventional example of a signal transmission circuit.
Figure 2:
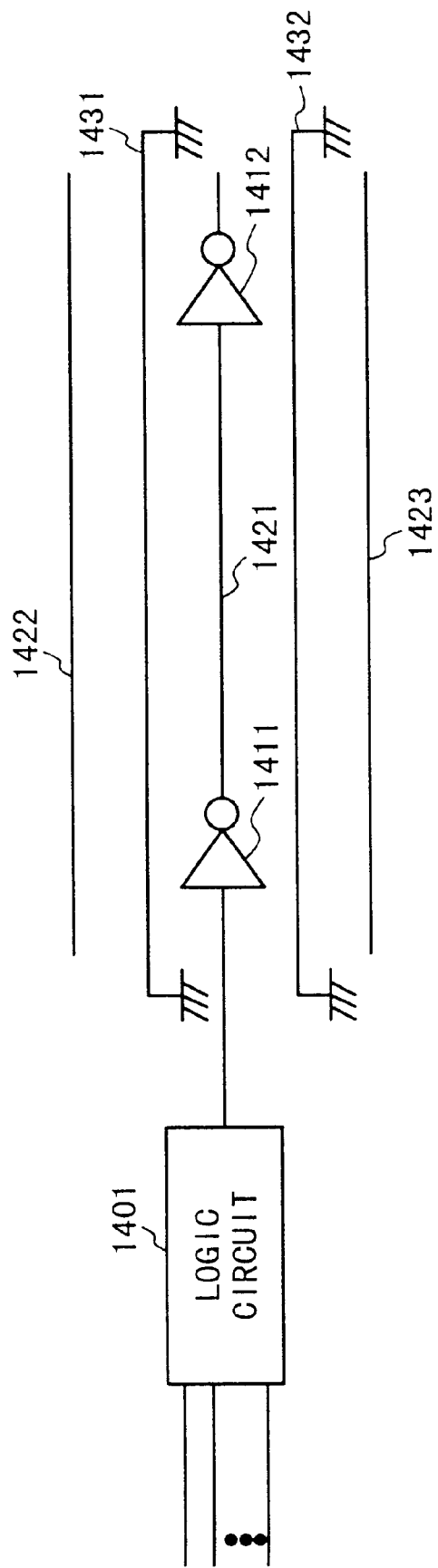
FIG. 2 is a circuit diagram illustrating the structure of the second conventional example of the signal transmission circuit using shield lines.

A signal transmission circuit of the present invention will be described below in detail with reference to the accompanying drawings. Note that same components are assigned with same reference numerals in the following description.

FIG. 3A is a circuit diagram illustrating the principle of the present invention. In the principle of the present invention shown in FIG. 3A, a data signal line 121 is driven by a driver 111 based on a transmission signal generated from a logic circuit 101. In this example, the logic circuit 101 does not includes a flip-flop circuit. However, as understood from the following description, the present invention can be applied to the logic circuit including a flip-flop circuit. The transmission signal is transmitted to a receiver inverter 112 on a data signal line 121.

FIG. 3B is an expanded partial cross sectional view of wiring patterns when the signal transmission circuit in a semiconductor integrated circuit is cut along the line x-y in FIG. 3A. According to the cross section of the wiring patterns, there are the data signal line 121 and data signal lines 122 and 123 which are all provided in an insulating film. Also, a predicting circuit 102 is provided to be connected to a boost signal lines 131. The boost signal lines 131 are provided between the data signal lines 121 and 122 and between the data signal lines 121 and 123 to be adjacent to the data signal line 121 apart from it. The predicting circuit 102 receives input signals which are supplied to the logic circuit 101, predicts the signal level change on the data signal line 121, generates the boost signal on the boost signal lines 131 based on the prediction result and drives the boost signal lines 131.

The signals on the boost signal lines 131 reduce capacitive coupling between the data signal line 121 and each of the data signal line 122 and 123. Also, the signal on the boost signal lines 131 accelerate the change of the signal level on the data signal line 121.

When the signals on the boost signal lines 131 interfere with the signals on the data signal line 122 and 123, shield lines connected to the power supply line or the ground line may be further provided between the boost signal lines 131 and each of the data signal lines 122 and 123. Alternatively, another predicting circuit like the predicting circuit 102 and boost signal lines like the boost signal lines 131 may be further provided between the boost signal lines 131 of the data signal lines 122 and 123.

Figure 4:
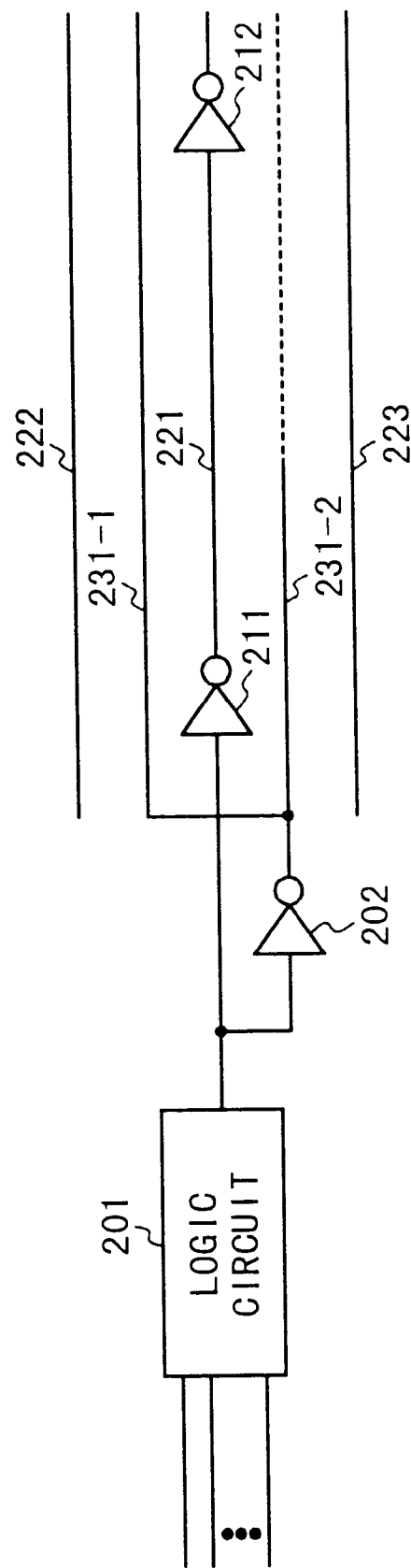
FIG. 4 is a circuit diagram illustrating the structure of the signal transmission circuit according to the first embodiment of the present invention.

FIG. 4 is a circuit diagram illustrating the structure of the signal transmission circuit according to the first embodiment of the present invention. Referring to FIG. 4, the signal transmission circuit of the first embodiment is composed of a logic circuit 201, inverters 202 and 211 and a receiver inverter 212.

In the signal transmission circuit of the first embodiment, a data signal line 221 is driven by the drive inverter 211 based on a transmission signal generated from the logic circuit 201 to transmit the transmission signal. The transmission signal is received by the receiver inverter 212 on the data signal line 221.

Also, boost signal lines 231 (231-1 and 231-2) are provided between the data signal line 221 and each of data signal lines 222 and 223, respectively. In this example, the boost line 231-1 is provided for the whole data signal line 221 but the boost line 231-2 is provided for not whole of the data signal line 221 but a part of the data signal line 221. Even in this case, the advantage of the present invention can be achieved. Also, one end of each of the boost lines 231 which is not connected to the inverter 202 is opened. If the end is connected to the power supply line or ground line, the amplitude of the signal on the boost lines 231 is restricted. However, even in this case, the advantage of the present invention can be achieved, although it is slight. The boost signal lines 231 (231-1 and 231-2) are driven by the inverter 202 for inverting a boost signal. In this example, the transmission signal generated by the logic circuit 201 is used as the boost signal. As a result, the boost signal having the same phase as the transmission signal on the data signal line 221 is applied to the boost signal lines 231.

Figure 5:
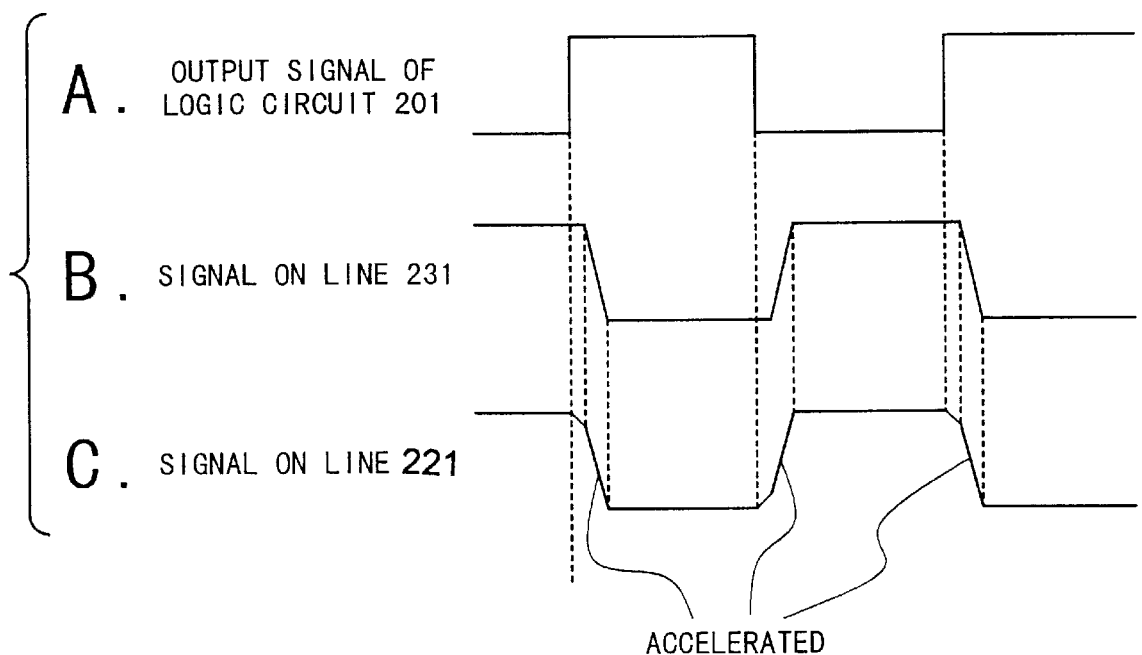
FIGS. 5A to 5C are timing charts to explain the operation of the signal transmission circuit according to the first embodiment of the present invention.

FIGS. 5A to 5C are timing charts to explain the operation of the signal transmission circuit in the first embodiment shown in FIG. 4. The output from the logic circuit 201 shown in FIG. 5A is supplied to the two inverters 202 and 211. The boost signal lines 231 and the data signal line 221 are driven with the in-phase signal. For this reason, as shown in FIGS. 5B and 5C, the boost signal on the boost signal lines 231 and the transmission signal on the data signal line 221 change with the same phase. Therefore, the influence of the data signal lines 222 and 223 to the data signal line 221 can be blocked off by the boost signal lines 231. Also, the coupling capacitances between the data signal line 221 and each of the data signal lines 222 and 223 do not act as load of the inverter 202. Therefore, the transmission signal on the data signal line 221 can be relatively speeded up, unlike the boost signal lines 231 connected to a fixed potential. Further, if the boost signal on the boost signal lines 231 changes abruptly, compared with the transmission signal on the data signal line 221, the level change of the transmission signal on the data signal line 221 can be accelerated at the rising and falling edges.

Figure 6:
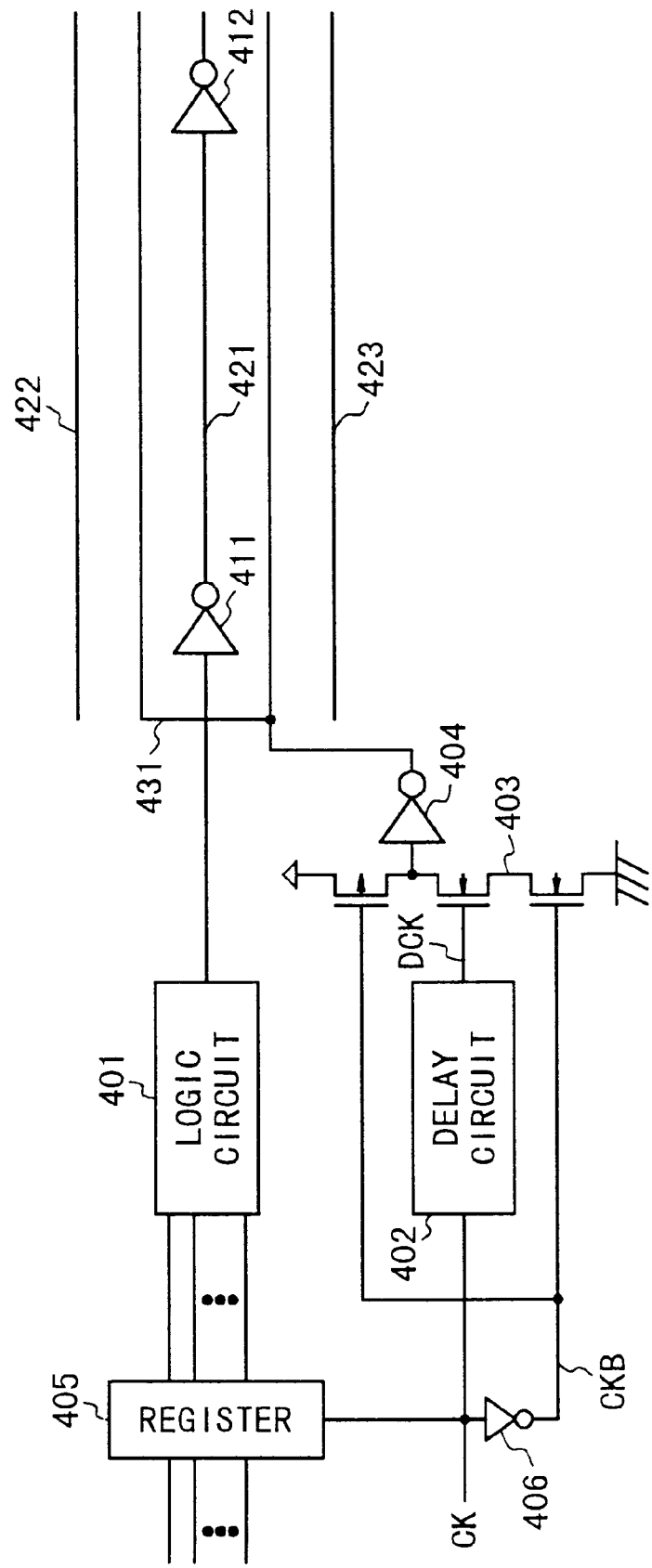
FIG. 6 is a circuit diagram illustrating the structure of the signal transmission circuit according to the second embodiment of the present invention.

FIG. 6 is a circuit diagram illustrating the structure of the signal transmission circuit according to the second embodiment of the present invention. The signal transmission circuit of the second embodiment is composed of a logic circuit 401, a delay circuit 402, a dynamic type inverter (clocked inverter) 403, inverters 404, 406, and 411, a register 405, and a receiver inverter 412.

In the signal transmission circuit of the second embodiment, a register 405 is provided in the front stage of the logic circuit 401 to latch and output data signals in synchronous with a clock signal CK. The logic circuit 401 receives data signals outputted from the register 405 and generates a transmission signal. A data signal line 421 is driven by the drive inverter 411 based on the transmission signal generated by the logic circuit 401. The transmission signal on the data signal line 421 is received by the receiver inverter 412.

Also, in the signal transmission circuit of the second embodiment, the clock signal CK is inverted by the inverter 406 to generate an inverted clock signal CKB. The clock signal CK is supplied to the delay circuit 402 and a delayed clock signal DCK is outputted from the delay circuit 402. The output signal DCK of a delay circuit 402 and the inverted clock signal CKB are connected to the input terminals of the dynamic type inverter (clocked inverter) 403.

In the dynamic type inverter (clocked inverter) 403, for example, two N channel MOSFETs are arranged on the side of the ground line and one P channel MOSFET is arranged between a power supply line and the two N channel MOS- FETs. The inverted clock signal CKB is supplied to the gates of the P channel MOSFET and N channel MOSFET on the side of the ground line. The delayed clock signal DCK is supplied to the gate of the other N channel MOSFET. The node between the P channel MOSFET and the upper side N channel MOSFET is connected to the input terminal of the inverter 404.

Boost signal lines 431 are provided between the data signal line 421 and each of data signal lines 422 and 423. The output signal of the dynamic type inverter (clocked inverter) 403 is connected to the input terminal of the inverter 404, and the boost signal lines 431 are driven by the inverter 404 in accordance with the output of the dynamic type inverter (clocked inverter) 403.

Instead of the dynamic type inverter (clocked inverter) 403, a circuit may be used in which synchronization is established between the inverted clock signal CKB and the delayed clock signal DCK, and whose output is supplied to the inverter 404.

Figure 7:
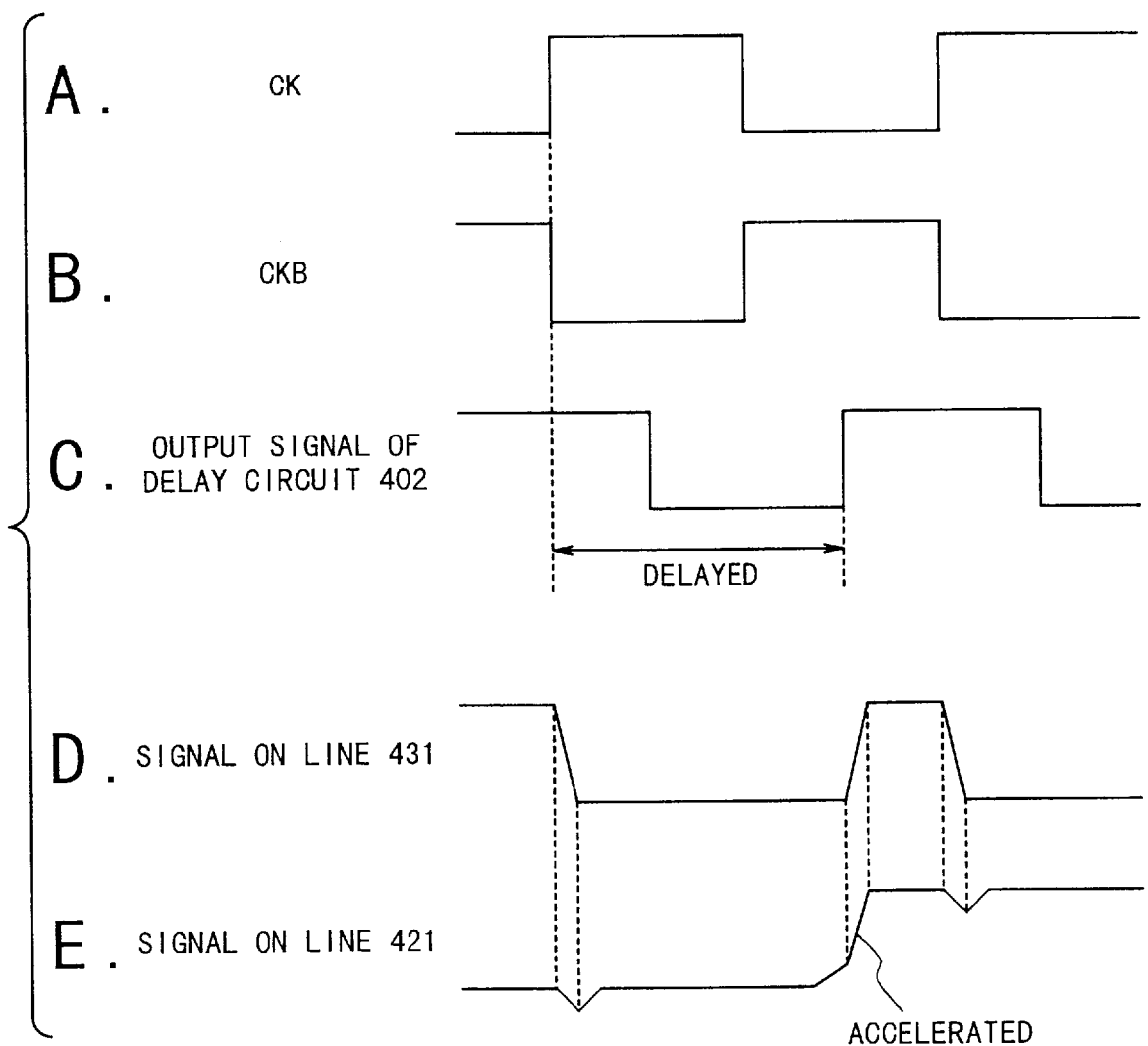
FIGS. 7A to 7E are timing charts to explain the operation of the signal transmission circuit according to the second embodiment of the present invention.

FIGS. 7A to 7E are timing charts of the signal transmission circuit of the second embodiment shown in FIG. 6. In the signal transmission circuit of the second embodiment, the delay time of the output of the delay circuit 402 shown in FIG. 7C is adjusted so that the timing of the rising edge of the transmission signal on the data signal line 421 is coincident with the timing of the rising edge of the boost signal on the boost signal lines 431. That is, the delay time corresponds to a critical path of the logic circuit 401 in signal processing for the transmission signal. That is, the delay time due to the dynamic type inverter (clocked inverter) 403 and the inverter 404 is set to be equal to a sum of a delay time of the register 405 for the clock signal CK, a delay time on the critical path in the logic circuit 401 and a delay time of the drive inverter 411. As the critical path, there is a circuit such as a carry propagation circuit in a parallel adder.

In this manner, the clock signal CK is delayed by the delay circuit 402 by a predetermined time, as shown in FIG. 7C. Also, a logical product of the delayed clock signal and the inverted clock signal CKB shown in FIG. 7B and obtained by inverting the clock signal CK shown in FIG. 7A is calculated to form the boost signal on the boost signal lines 431 shown in FIG. 7D. For this reason, the transmission signal on the data signal line 421 which is transmitted through the register 405, the logic circuit 401, and the inverter 411, and the boost signal on the boost signal lines 431 rise up at approximately the same timing. In accordance with, the elimination of the cross talk noise from the data signal line 422 and 423 and the relatively speeding-up of the transmission signal on the data signal line 121 become possible, as described in the principle of the present invention.

Figure 8:
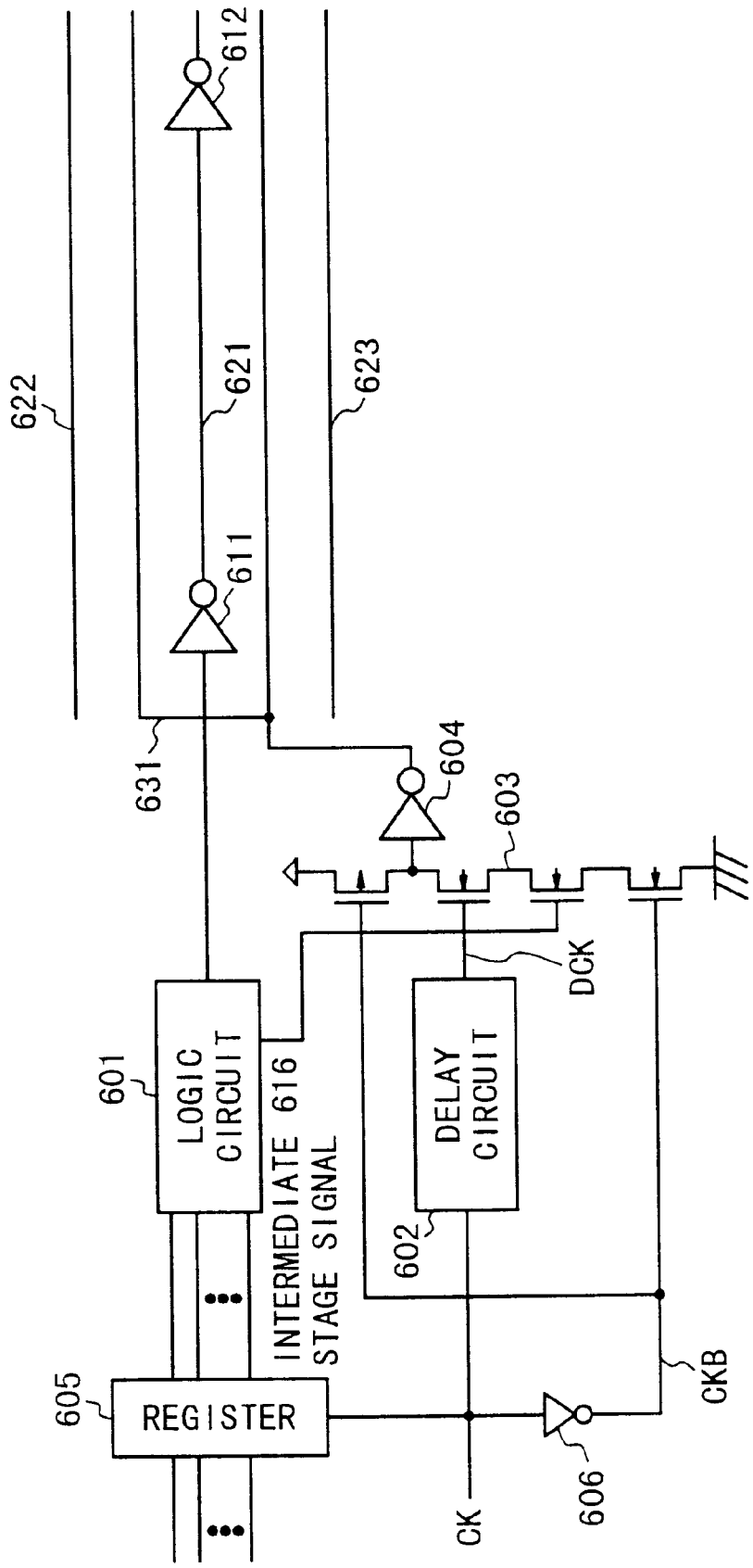
FIG. 8 is a circuit diagram illustrating the structure of the signal transmission circuit according to the third embodiment of the present invention.

FIG. 8 is a circuit diagram illustrating the structure of the signal transmission circuit according to the third embodiment of the present invention. Referring to FIG. 8, the signal transmission circuit of the third embodiment is composed of a logic circuit 601, a delay circuit 602, a dynamic type inverter (clocked inverter) 603, inverter 604, 606 and 611, a register 605 and a receiver inverter 612.

In the signal transmission circuit of the third embodiment, the register 605 is provided in the front stage on the logic circuit 601 to operate in synchronous with a clock signal CK. A data signal line 621 is driven by a drive inverter 611 based on a transmission signal which is generated by the logic circuit 601. The transmission signal transmitted on the data signal line 621 is received by the receiver inverter 612.

Boost signal lines 631 are arranged between the data signal line 621 and each of data signal lines 622 and 623 and are driven by the inverter 604.

The signal transmission circuit of the third embodiment is different from the second embodiment in the following points. That is, the dynamic type inverter (clocked inverter) 403 in FIG. 6 is replaced by a dynamic type NAND gate (clocked NAND gate) 603. In the dynamic type NAND gate (clocked NAND gate) 603, two N channel MOSFETs in the second embodiment are replaced by three N channel MOSFETs. The delayed clock signal CK, the inverted clock signal CKB and an intermediate stage signal 616 from the logic circuit 601 is connected to the input terminals of the three N channel MOSFETs of the dynamic type NAND gate (clocked NAND gate) 603, respectively. The intermediate stage signal 616 is a signal used for generating the transmission signal in the logic circuit 601. Instead of the dynamic type NAND gate (clocked NAND gate), a circuit may be used in which a logical product of the inverted clock signal CKB and the intermediate stage signal 616 are synchronized with the delayed clock signal CK and the output of the circuit is inputted to the inverter 604.

Next, the operation of the signal transmission circuit of the third embodiment will be described, comparing to that of the second embodiment. For example, the intermediate stage signal 616 is in a logic state on the critical path of the logic circuit 601. The intermediate stage signal 616 specifies the time when an erroneous signal level is easy to be generated on the data signal line 621 during the transmission period due to the cross talk noise.

The logical product of the intermediate stage signal 616, the delayed clock signal CK and the inverted clock signal CKB is calculated by the dynamic type NAND gate (clocked NAND gate) 603. Therefore, the timing of the rising edge of the boost signal on the boost signal lines 631 is limited by the intermediate stage signal 616 on the critical path. In this way, the boost signals on the boost signal lines 631 change at the timing when effective advantage to the transmission signal on the data signal line 621 can be obtained. Also, because the boost signal on the boost signal lines 631 changes with the same phase as the transmission signal, the signal level change of the boost signal is suppressed at the unnecessary timings when any effect cannot be obtained, unlike the second embodiment. In this manner, the influence of the generation of cross talk noise and the influence of the boost signal to the transmission signal on the data signal line 621 can be restrained.

Figure 9:
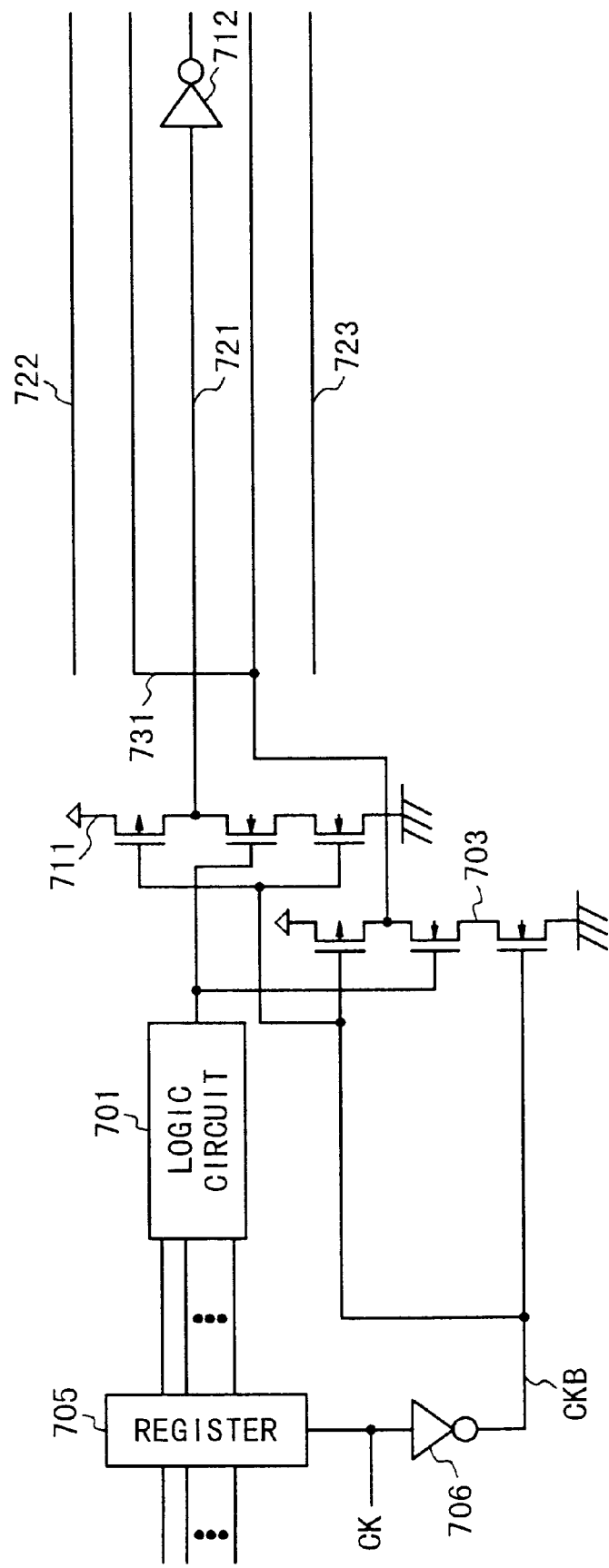
FIG. 9 is a circuit diagram illustrating the structure of the signal transmission circuit according to the fourth embodiment of the present invention.

FIG. 9 is a circuit diagram illustrating the structure of the signal transmission circuit according to the fourth embodiment of the present invention. Referring to FIG. 9, the signal transmission circuit of the fourth embodiment is composed of a logic circuit 701, a register 705, an inverter 706, dynamic type inverters (clocked inverters) 703 and 711 and a receiver inverter 712.

In the signal transmission circuit of the fourth embodiment, a register 705 is provided in the front stage of the logic circuit 701 to operate in synchronous with the clock signal CK. A data signal line 721 is driven by the first dynamic type inverter (clocked inverter) 711 based on a transmission signal generated by the logic circuit 701. Also, the transmission signal on the data signal line 721 is received by the receiver inverter 712.

In the signal transmission circuit of the fourth embodiment, the boost signal lines 731 are arranged between the data signal line 721 and each of data signal lines 722 and 723, and are driven by the second dynamic type inverter (clocked inverter) 703.

In the first and second dynamic type inverters (clocked inverters) 711 and 703, for example, two N channel MOSFETs are arranged on the side of the ground line and one P channel MOSFET is arranged on the side of the power supply line. All the MOSFETs are connected between the power supply line and the ground line in series. The transmission signal generated by the logic circuit 701 is connected to the gate of N channel MOSFET at the center in each of the inverters 703 and 711. The inverted clock signal CKB obtained by inverting the clock signal by the inverter 706 is connected to the gate terminals of upper and lower MOSFETs in each of each of the inverters 703 and 711. Also, the data signal line 721 and the boost signal lines 731 are connected to the output terminal of the first dynamic type inverter (clocked inverter) 711 and the output terminal of the second dynamic type inverter (clocked inverter) 703, respectively.

Instead of the dynamic type inverter (clocked inverter), a circuit may be used in which the transmission signal generated by the logic circuit 701 is inputted and inverted in synchronous with the inverted clock signal CKB.

Figure 10:
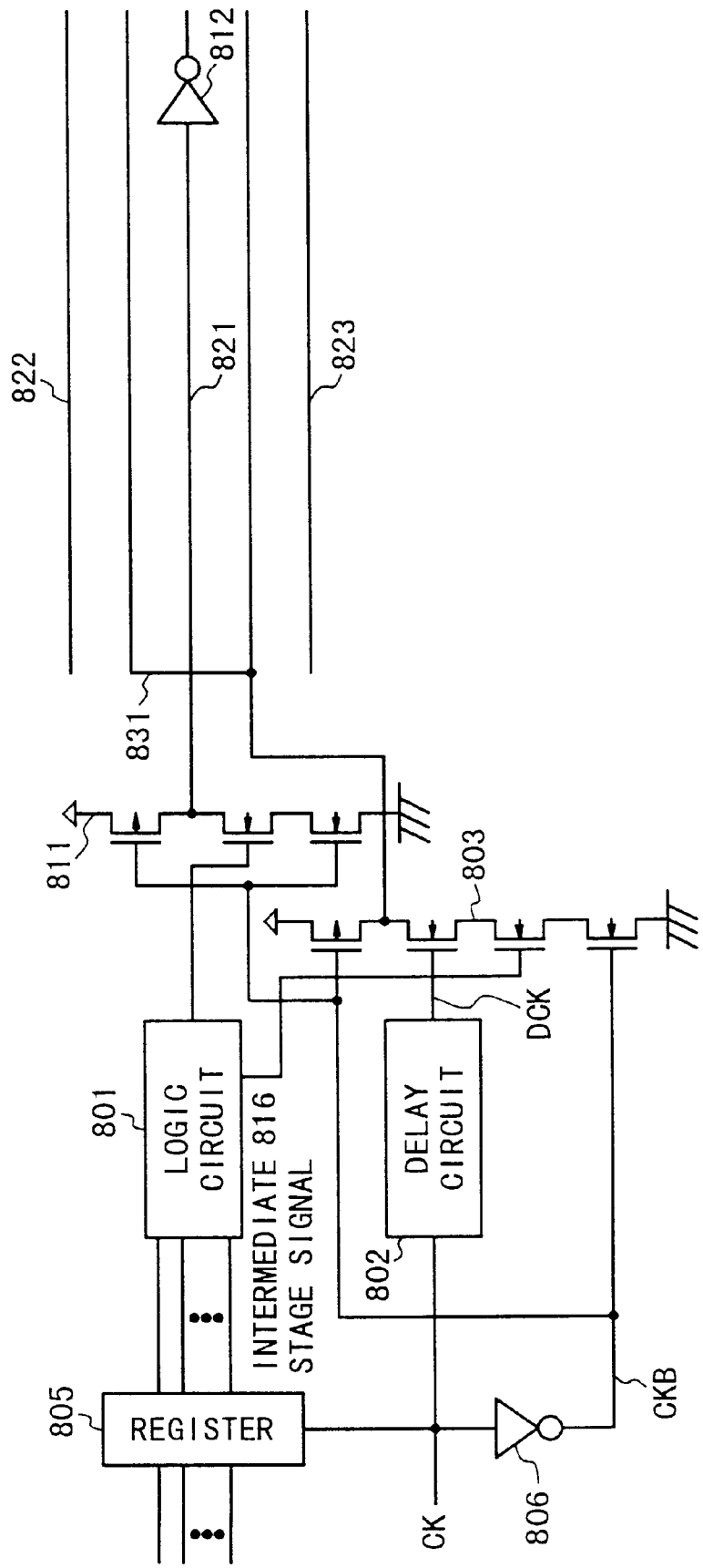
FIG. 10 is a circuit diagram illustrating the structure of the signal transmission circuit according to the fifth embodiment of the present invention.

FIG. 10 is a circuit diagram illustrating the structure of the signal transmission circuit according to the fifth embodiment of the present invention. Referring to FIG. 10, the signal transmission circuit of the fifth embodiment is composed of a logic circuit 801, a delay circuit 802, a dynamic type NAND gate (clocked NAND gate) 803, a dynamic type inverter (clocked inverter) 811, a register 805, an inverter 806 and a receiver inverter 812.

In the signal transmission circuit of the fifth embodiment, the register 805 is provided in the front stage of the logic circuit 801 to operate in synchronous with a clock signal CK. A data signal line 821 is driven by a dynamic type inverter (clocked inverter) 811 based on a transmission signal generated by the logic circuit 801. Also, the transmission signal on the data signal line 821 is received by the receiver inverter 812.

Also, in the signal transmission circuit of the fifth embodiment, boost signal lines 831 are arranged between the data signal line 821 and each of data signal lines 822 and 823 and are driven by the dynamic type NAND gate (clocked NAND gate) 803.

The signal transmission circuit in the fifth embodiment is different from that of the fourth embodiment in that the dynamic type NAND gate (clocked NAND gate) 803 is used in place of the second dynamic type inverter (clocked inverter) 703 shown in FIG. 9. Also, an intermediate stage signal 816 from the logic circuit 801 is connected to the different input terminal in the dynamic type NAND gate (clocked NAND gate) 803, in addition to the delayed clock signal CK and the inverted clock signal CKB.

The structure and operation of the first dynamic type inverter (clocked inverter) 811 are the same as those of the first dynamic type inverter 711 (clocked inverter) in the fourth embodiment.

In the dynamic type NAND gate (clocked NAND gate) 803, one P channel MOSFET is arranged on the side of the power supply line and three N channel MOSFETs are arranged on the side of the ground line. All the MOSFETs are connected in series between the power supply line and the ground line. The output terminal of the delay circuit 802 is connected to the gate of the N channel MOSFET on the side of the power supply line, the intermediate stage signal 816 is connected to the gate of the N channel MOSFET at the center. The boost signal lines 831 are connected to the output terminal of the dynamic type NAND gate (clocked NAND gate) 803.

Instead of the dynamic type NAND gate (clocked NAND gate), a circuit may be used in which the intermediate stage signal 816 and the delayed clock signal DCK are inputted in synchronous with the inverted clock signal CKB.

Figure 11:
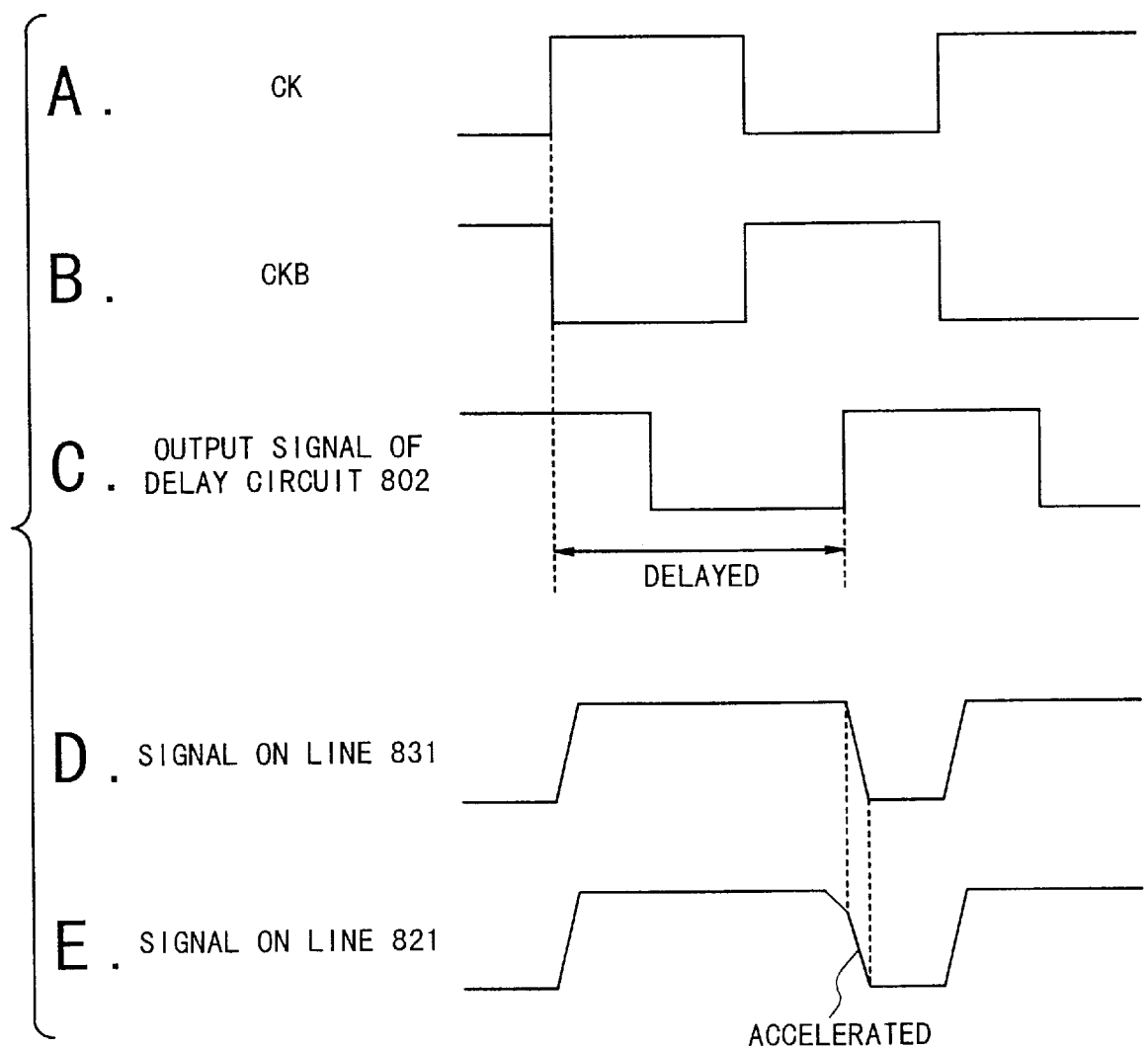
FIGS. 11A to 11E are timing charts to explain the operation of the signal transmission circuit according to the fifth embodiment of the present invention.

FIGS. 11A to 11E are timing charts to explain the operation of the signal transmission circuit shown in FIG. 10. As shown in FIG. 11C, when the delay time of the delay circuit 802 is designed in such a manner that a sum of the delay time of the delay circuit 802 and the delay time of the dynamic type NAND gate (clocked NAND gate) 803 is equal to a sum of the delay time of the register 805, a delay time in a critical path on the logic circuit 801, and the delay time of the dynamic type inverter (clocked inverter) 811. In other words, the timing of the falling edge of the transmission signal on the data signal line 821 corresponding to the critical path on the logic circuit 801 is coincident with the timing of the falling edge of the boost signal on the boost signal lines 831.

For this reason, as shown in FIG. 11C, the clock signal CK is delayed by the delay circuit 802 by a predetermined time period. A logical product of the inverted clock signal CKB, the delayed clock signal DCK and the intermediate stage signal 816 is calculated and outputted as the boost signal on the boost signal lines 831 as shown in FIG. 11D. For this reason, the transmission signal transmitted through the register 805, the logic circuit 801 and the dynamic inverter (clocked inverter) 811 on the data signal line 821 and the boost signal on the boost signal lines 831 fall down at the same timings, as shown in FIGS. 11D and 11E. In accordance with, the relatively speeding-up of the transmission signal on the data signal line 821 is made possible during the signal transmission corresponding to the critical path in the logic circuit 801, as well as the elimination of cross talk noise.

Figure 12:
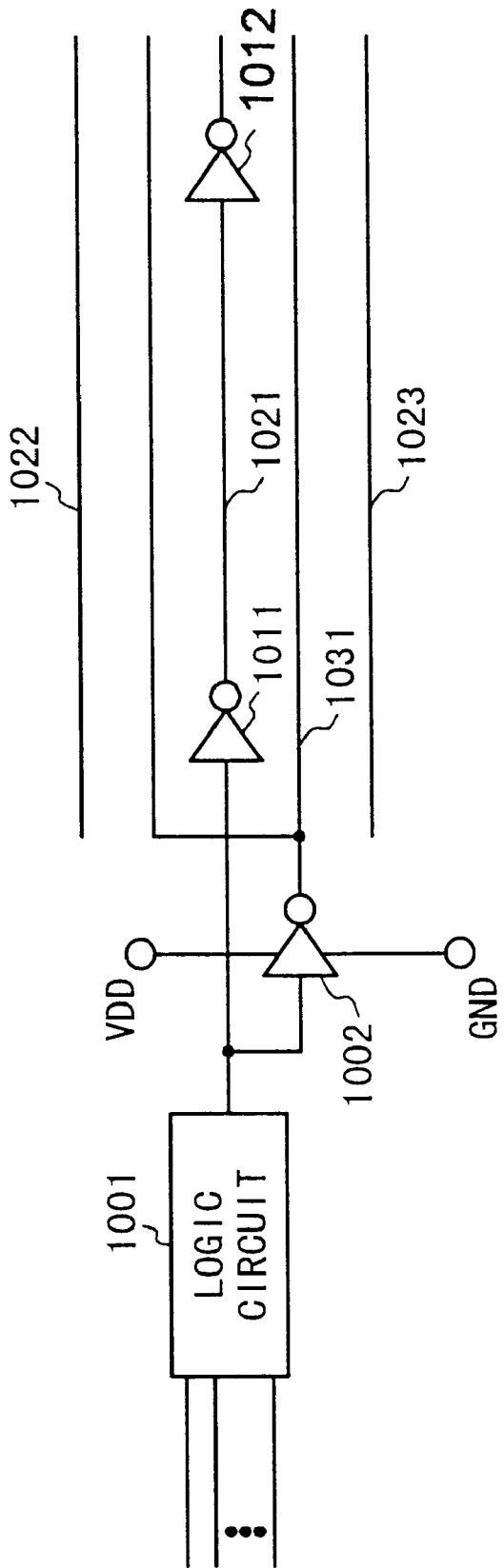
FIG. 12 is a circuit diagram illustrating the structure of the signal transmission circuit according to the sixth embodiment of the present invention.

FIG. 12 is the circuit diagram illustrating the structure of the signal transmission circuit according to the sixth embodiment of the present invention. Referring to FIG. 12, the signal transmission circuit of the sixth embodiment is composed of a logic circuit 1001, inverters 1002 and 1011 and a receiver inverter 2012.

In the signal transmission circuit of the sixth embodiment, a data signal line 1021 is driven by the drive inverter 1011 based on a transmission signal generated by the logic circuit 1001. The transmission signal is transmitted on the data signal line 1021 and is received by the receiver inverter 1012.

In the signal transmission circuit of the sixth embodiment, boost signal lines 1031 are arranged between the data signal line 1021 and each of data signal line 1022 and 1023. The boost signal lines 1031 are driven by the inverter 1002 which inverts the transmission signal generated by the logic circuit 1001. The inverter 1002 is connected to a high power supply voltage VDD and inverts and amplifies the boost signal which has the same phase as the transmission signal.

The high power supply voltage inverter 1002 is an inverter which is connected to the voltage VDD higher than the normal power supply voltage of the signal transmission circuit for the drive inverter 1011, and to a ground voltage GND lower than the normal ground voltage GND for the drive inverter 1011.

In this way, because the boost signal on the boost signal lines 1031 has the same phase as that of the transmission signal on the data signal line 1021, cross talk noise is eliminated. Also, when an amplitude of the boost signal is made larger, the transmission signal on the data signal line 1021 can be accelerated larger.

Note that one of the high power supply voltage VDD and the low ground voltage GND may be equal to the normal power supply voltage or the normal ground voltage.

Figure 13:
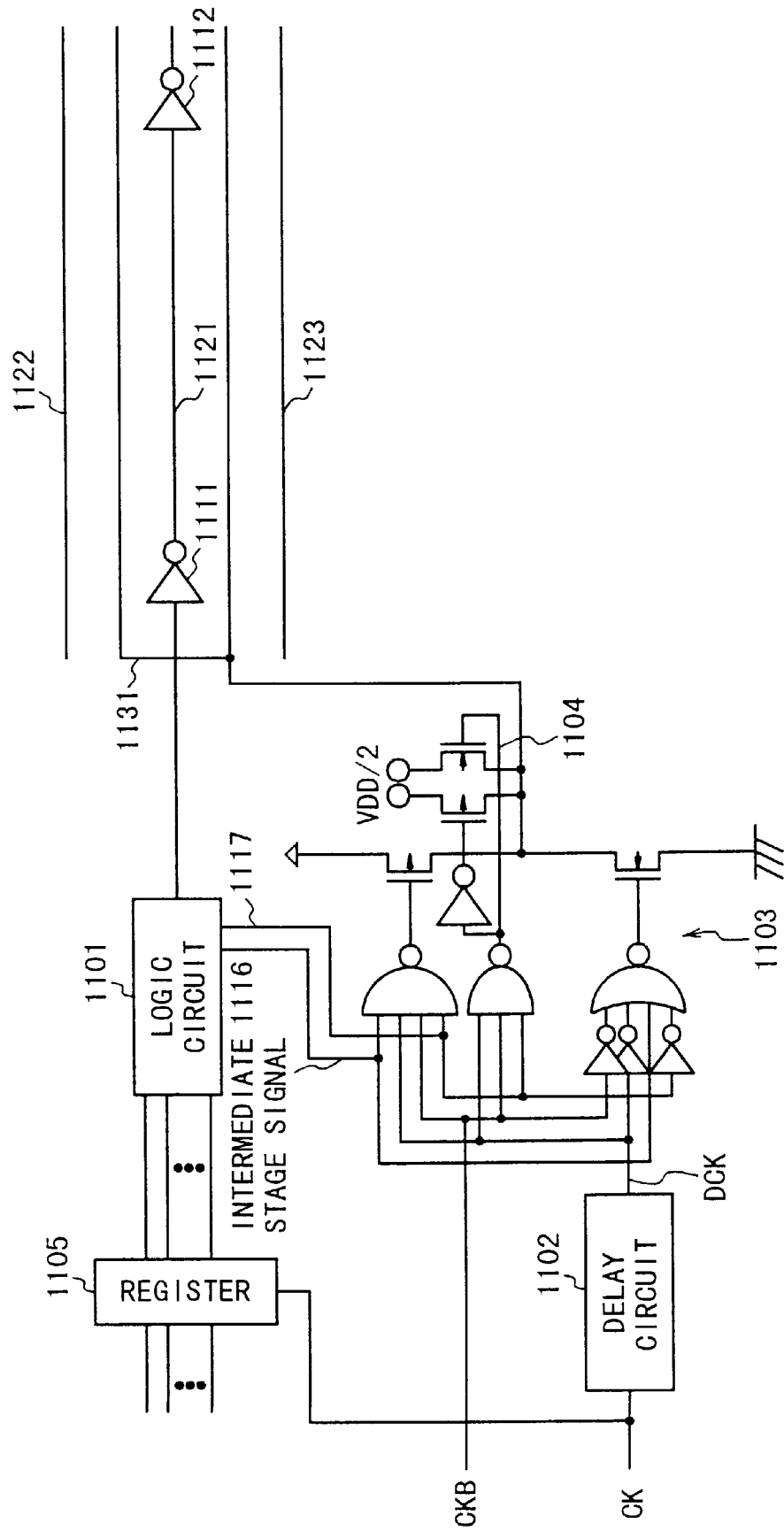
FIG. 13 is a circuit diagram illustrating the structure of the signal transmission circuit according to the seventh embodiment of the present invention.

FIG. 13 is a circuit diagram illustrating the structure of the signal transmission circuit according to the seventh embodiment of the present invention.

Referring to FIG. 13, the signal transmission circuit in the seventh embodiment is composed of a logic circuit 1101, a tri-state buffer 1103, a transfer gate 1104, a delay circuit 1102, a register 1105, an inverter 1111 and a receiver inverter 1112.

In the signal transmission circuit in the seventh embodiment, the register 1105 is provided in the front stage on the logic circuit 1101 to operate in synchronous with a clock signal CK. A data signal line 1121 is driven by the drive inverter 1111 based on a transmission signal generated by the logic circuit 1101. The transmission signal is transmitted on the data signal line 1121 and is received by the receiver inverter 1112.

In the signal transmission circuit of the seventh embodiment, the delay circuit 1102 is provided to delay the clock signal CK to generate a delayed clock signal DCK. Also, the tri-state buffer 1103 is composed of two NAND gates and a NOR gate and provided to estimate that the transmission signal on the data signal line 1121 changes, using the delayed clock signal DCK. Further, the transfer gate 1104 is provided to supply a predetermined intermediate potential. Boost signal lines 1131 are arranged between the data signal line 1121 and each of data signal line 1122 and 1123 and are driven by the transfer gate 1104.

In the tri-state buffer 1103, for example, a P channel MOSFET whose gate is connected to the output of the first NAND gate is arranged on the side of the power supply line. An N channel MOSFET whose gate is connected to the output of the NOR gate is arranged on the side of the ground line. The two MOSFETs are connected to between the power supply line and the ground line in series. Instead of the tri-state buffer 1103, a tri-state circuit may be used which can be connected to the power supply line and the ground line.

In the first NAND gate, two intermediate stage signals 1116 and 1117 from the logic circuit 1101, the delayed clock signal DCK and an inverted clock signal CKB obtained by inverting the clock signal CK are connected to the input terminals. In the NOR circuit, the intermediate stage signal 1116 is inputted as it is, and the intermediate stage signal 1117, the inverted clock signal CKB and the delayed clock signal DCK are also inputted in the inverted form.

In the transfer gate 1104, a P channel MOSFET and an N channel MOSFET are provided in parallel between the predetermined intermediate potential and the boost signal lines 1131. The gate of the P channel MOSFET is connected to the output of the second NAND gate via an inverter and the gate of N channel MOSFET is connected directly to the output of the second NAND gate. The second NAND gate inputs the inverted clock signal CKB, the delayed clock signal DCK and the intermediate signal 1117. Instead of the transfer gate 1104, a circuit may be used in which can be connected to a predetermined voltage.

Note that ½ of the power supply voltage for the drive inverter 1111 and the receiver inverter 1112 is suitable for as the intermediate potential. Also, a delay time by the delay circuit 1102 is determined taking into account the operation times of the tri-state buffer 1103 and transfer gate 1104, as in the second embodiment.

FIGS. 14A to 14G are timing charts to explain the operation of the signal transmission circuit shown in FIG. 13. In this case, the intermediate stage signal 1116 is the same as the intermediate stage signal 616 in the signal transmission circuit in the third embodiment. The intermediate stage signal 1117 is used to specify the period during which an erroneous operation is easy to cause before and after the intermediate stage signal 1116. In other words, the level change in the boost signal on the boost signal lines 1131 is limited only into the period when the intermediate stage signal 1117 is in the logic "H" level. In this manner, the unnecessary level change of the boost signal during the period which any influence is not given to the transmission signal on the data signal line 1121 can be suppressed. Thus, the influence on which it is impossible to estimate can be previously prevented.

Figure 14:
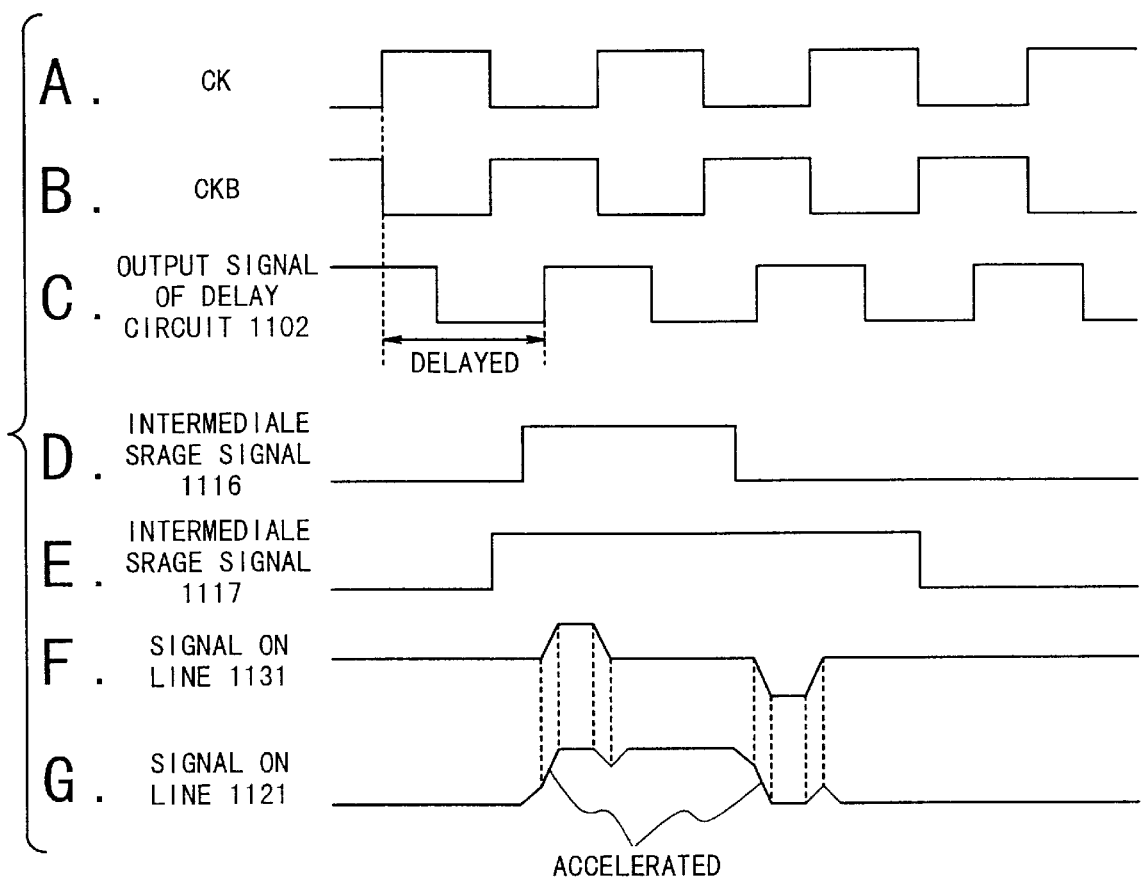
FIGS. 14A to 14G are timing charts to explain the operation of the signal transmission circuit according to the seventh embodiment of the present invention.

As the first logic, when the two intermediate stage signals 1116 and 1117 shown by FIGS. 14D and 14E are both in the logic "H" level, and the inverted clock signal CKB is in the logic "H" level as shown in FIG. 14B, the matching of the condition is established during the period when the delayed clock signal DCK is in the logic "H" level as shown in FIG. 14C. Therefore, the boost signal on the boost signal lines 1131 goes to "H" level in coincident with the timing of the rising of the transmission signal on the data signal line 1121, as shown in FIGS. 14F and 14G.

As the second logic, when the intermediate stage signal 1117 is set to the logic "H", as shown in FIG. 14E, the intermediate stage signal 1116 is set to the logic "L" as shown in FIG. 14D, and the inverted clock signal CKB is set to the logic "H" level, the matching of the condition is established during the period when the delayed clock signal DCK is in the logic "H" level as shown in FIG. 14C. Therefore, the boost signal on the boost signal lines 1131 goes to "L" level in coincident with the timing of the falling of the transmission signal on the data signal line 1121, as shown in FIGS. 14F and 14G.

As the third logic, the intermediate stage signal 1117 is set to the logic "L" level as shown in FIG. 14E, the inverted clock signal CKB is set to the logic "L" as shown in FIG. 14B, or, the delayed clock signal DCK is set to the logic "L" level as shown in FIG. 14C. In accordance with, because a signal level on the boost signal lines 1131 is always fixed on the intermediate potential except for the period during which the first logic and second logic are established, the boost signal lines 1131 act as shield lines which are connected to the power supply or the ground line during this period. In other words, in the transmission signal on the data signal line 1121 corresponding to the intermediate stage signal 1116, the boost signal on the boost signal lines 1131 is changed in level with the same phase as the transmission signal at the timings of the rising edge and falling edge. Thus, the relative speeding-up can be accomplished while eliminating cross talk noise.

Note that it is necessary to take a signal delay in the tri-state buffer 1103 into account in either case.

The present invention was described in detail taking specific examples. However, the present invention is not limited to the above-mentioned embodiments. Of course, various modifications could be made by the skilled person in the art within the scope of the present invention.

As described above, there are the following effects in the signal transmission circuit of the present invention.

First, the reduction of signal transmission delay will be described.

Figure 15:
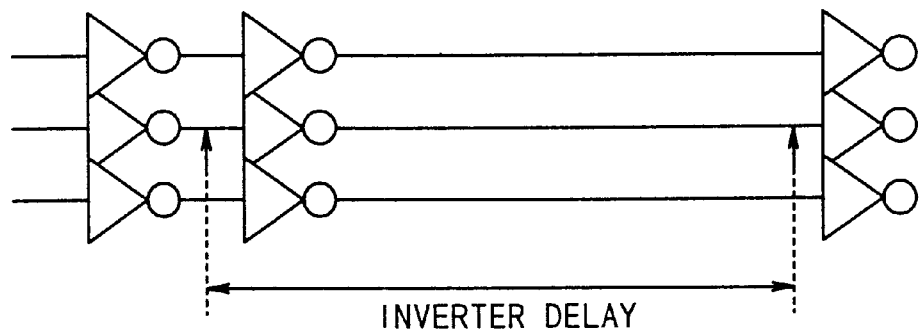
FIG. 15 is a circuit diagram to explain the operation delay of inverter circuits.

FIG. 15 is a circuit diagram illustrating the portion where inverter delay is caused. In the portion influenced by the inverter delay shown in FIG. 15, the load of one drive inverter is determined based on the wiring length of the influence part and a receiver inverter.

Figure 16:
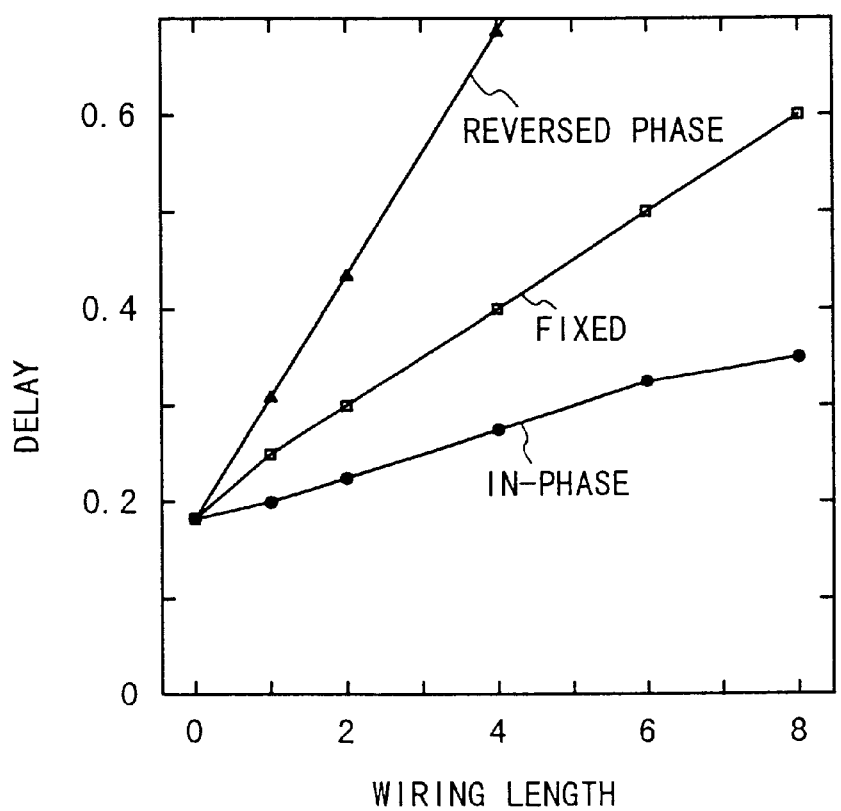
FIG. 16 is a diagram illustrating the operation delay in FIG. 15.

FIG. 16 is a graph illustrating a delay operation in FIG. 15. The horizontal axis of the graph is the wiring length of the influence part and the vertical axis is the delay quantity of the inverter delay. Also, a phase relation of the boost signal to the transmission signal is employed as the parameters (fixed, in-phase, and opposite phase).

That is, when the boost signal on the boost signal lines changes with the same phase as the transmission signal on the transmission signal line, the capacitance between the lines does not act as the load of the inverter. Also, if the boost signal level changes steeply with the large amplitude, compared to the transmission signal, the level change of the transmission signal is accelerated. Therefore, a delay increase from the delay quantity in the wiring length of "0" becomes a half of that when the potential is fixed.

Next, the reduction of a pattern area in the integrated circuit will be described. FIGS. 17A and 17B are diagrams illustrating the width of a wiring area in the present invention and the conventional example. In the present invention, the capacitance between a data signal line 1721 and a boost line 1731 does not originally act as a load. Rather, the boost line 1731 acts for the transmission signal to be speeded up. Therefore, in the present invention, the interval between both lines 1721 and 1731 can be made narrow until a limit value of the design rule of the semiconductor integrated circuit.

For example, if the minimum line width and the minimum line interval are 1 μm, the interval required to prevent increase of the load capacitance is 2 μm as shown in FIG. 17B in the conventional example. In other words, the width of the wiring area occupied by the data signal line 1721, two shield lines 1731 and two data signal lines 1722 and 1723 is 11 μm in the conventional example. On the other hand, in the present invention, it can be reduced to 9 μm as shown in FIG. 17A.

In FIG. 17C, a boost line 1731 is under the data signal line 1721 via an insulating layer. Other signal lines 1722 are provided apart from the data signal line 1721 by 2 μm. In this case, the cross talk noise can not be reduced but the transmission signal can be accelerated without widening the wiring area. Note that the boost signal line 1731 may be provided on the data signal line 1721 via the insulating layer.

In accordance with, the signal transmission circuit in a semiconductor integrated circuit can be provided to reduce cross talk noise while preventing the delay in the signal transmission.

What is claimed is:

1. A signal transmission circuit comprising:
   a logic circuit for performing a logical calculation to at least an inputted signal to output a transmission signal;
   a signal line;
   a signal line driver circuit connected to an end of said signal line, for driving said signal line in accordance with said transmission signal, the other end of said signal line being connected to a receiver;
   a protection line provided in parallel to said signal line having an open end;
   a protection line driver circuit connected to an end of said protection line for driving said protection line in accordance with a protection signal having a same phase as said transmission signal; and
   a protection signal generating circuit for predicting said transmission signal and for generating said protection signal based on the predicting result.

2. A signal transmission circuit according to claim 1, wherein said protection line has a length equal to at least a part of said signal line.

3. A signal transmission circuit according to claim 1, wherein said protection line is provided on or under said signal line via an insulating layer.

4. A signal transmission circuit according to claim 1, wherein another signal line is provided in parallel to said signal line, and said protection line is provided between said signal line and said another signal line.

5. A signal transmission circuit according to claim 4, wherein said signal transmission circuit is formed in a semiconductor circuit, and a distance between said signal line and said protection line and a distance between said protection line and said another signal line are equal to a least pattern size.

6. A signal transmission circuit according to claim 1, wherein said protection signal is identical to said transmission signal.

7. A signal transmission circuit according to claim 6, wherein said protection line driver circuit drives said protection line in accordance with said protection signal such that a signal on said protection line has an amplitude larger than that of a signal on said signal line.

8. A signal transmission circuit according to claim 7, wherein said protection line driver circuit drives said protection line in accordance with said protection signal such that a signal on said protection line has an amplitude larger than that of a signal on said signal line.

9. A signal transmission circuit according to claim 6, wherein said logic circuit inputs said at least one signal in synchronous with a clock signal to output said transmission signal, and said protection line driver circuit drives said protection line in accordance with said protection signal in synchronous with said clock signal.

10. A signal transmission circuit according to claim 1, wherein said logic circuit inputs said at least one signal in synchronous with a clock signal to output said transmission signal, and said protection line driver circuit drives said protection line in accordance with said protection signal which is obtained from a logical calculation of said clock signal and a delayed signal of said clock signal, a delay time of said clock signal being substantially a same as a time for said logical calculation in said logic circuit.

11. A signal transmission circuit according to claim 1, wherein said logic circuit inputs said at least one signal in synchronous with a clock signal, and outputs an intermediate stage signal in addition to said transmission signal, and said protection line driver circuit drives said protection line in accordance with said protection signal which is obtained from a logical calculation of said clock signal, a delayed signal of said clock signal and said intermediate stage signal, a delay time of said clock signal being substantially a same as a time for said logical calculation in said logic circuit.

12. A signal transmission circuit according to claim 11, wherein said signal line driver circuit drives said signal line in accordance with said transmission signal in synchronous with said clock signal.

13. A signal transmission circuit comprising:
   a logic circuit for performing a logical calculation to at least one inputted signal to output transmission signal;
   a register for supplying said at least one signal to said logic circuit in synchronous with a clock signal;
   a signal line;
   a signal line driver circuit connected to an end of said signal line, for driving said signal line in accordance with said transmission signal, the other end of said signal line being connected to an receiver;

a protection line provided between said signal line and another signal line in parallel to said signal line; and a protection line driver circuit connected to an end of said protection line, for driving said protection line in synchronous with said clock signal such that a signal on said protection line rises at substantially the same timing as a signal on said signal line, the other end of said protection line being opened.

14. A signal transmission circuit according to claim 13, wherein said protection line driver circuit includes a dynamic type inverter for driving said protection line in accordance with said transmission signal and an inverted signal of said clock signal.

15. A signal transmission circuit according to claim 13, wherein said protection line driver circuit includes:

a delay circuit for delaying said clock signal for a time corresponding to a signal processing time in said logic circuit, to generate a delayed clock signal; and a dynamic type inverter for driving said protection line in accordance with said transmission signal, an inverted signal of said clock signal, and said delayed clock signal.

16. A signal transmission circuit according to claim 13, wherein said protection line driver circuit includes:

a delay circuit for delaying said clock signal for a time corresponding to a signal processing time in said logic circuit, to generate a delayed clock signal; and a dynamic type inverter for driving said protection line in accordance with at least an intermediate stage signal from said logic circuit, an inverted signal of said clock signal, and said delayed clock signal.

17. A signal transmission circuit according to claim 13, wherein said signal line driver includes a dynamic type inverter for inverting said transmission signal, and said protection line driver circuit includes a dynamic type inverter operating in synchronous with said clock signal and a dynamic type inverter for inverting an output of said dynamic type inverter.

18. A signal transmission circuit according to claim 13, wherein said signal line driver includes a dynamic type inverter for inverting said transmission signal in synchronous with an inverted signal of said clock signal, and said protection line driver circuit includes a dynamic type inverter operating in synchronous with said clock signal.

19. A method of transmitting a data signal and a transmission circuit comprising the steps of:

providing a protection line between a signal line and another signal line in parallel to said signal line, an end of said protection line on a receiver side being opened;

driving said signal line in accordance with a data signal; and driving said protection line in synchronous with said data signal, wherein said step of driving said signal line includes driving said signal line in accordance with said signal in synchronous with the clock signal, and wherein said step of driving said protection line includes driving said protection line in accordance with a protection signal which has a same phase as said data signal, and said clock signal.

20. A method of transmitting a data signal and a transmission circuit comprised in the steps of:

providing a protection line between a signal line and another signal line in parallel to said signal line, an end of said protection line on a receiver side being opened;

driving said signal line in accordance with the data signal; and driving said protection line insynchronous with said data signal, wherein said step of driving said signal line includes driving said signal with signal line in accordance with said data signal in synchronous with a clock signal; and wherein said step of driving said protection line includes driving said protection line in accordance with at least one signal used to generate said data signal, and said clock signal.

21. A signal transmission circuit comprising:

a logic circuit for performing a logical calculation to at least an inputted signal to output a transmission signal;

signal line;

a signal line driver circuit connected to an end of said signal line, for driving said signal line in accordance with said transmission signal, the other end of said signal line being connected to a receiver;

a protection line provided in parallel to said signal line having an open end; and a protection line driver circuit connected to an end of said protection line, for driving said protection line in accordance with a protection signal having a same phase as said transmission signal; wherein said protection signal is identical to said transmission signal and said protection line driver circuit drives said protection line in accordance with said protection signal such that a signal on said protection line has an amplitude larger than that of a signal on said signal line.

* * * * *